US011383377B2

(12) United States Patent
Murthy et al.

(10) Patent No.: US 11,383,377 B2
(45) Date of Patent: Jul. 12, 2022

(54) SYSTEM AND METHOD FOR BOT AUTOMATION LIFECYCLE MANAGEMENT

(71) Applicant: JPMorgan Chase Bank, N.A., New York, NY (US)

(72) Inventors: Shamanth Murthy, Bangalore (IN); Sanjay Saran Garg, Bangalore (IN); Vikash Kumar Jangid, Bangalore (IN); Vikramaditya Singh Rathore, Rajashan (IN)

(73) Assignee: JPMORGAN CHASE BANK, N.A., New York, NY (US)

( * ) Notice: Subject to any disclaimer, the term of this patent is extended or adjusted under 35 U.S.C. 154(b) by 947 days.

(21) Appl. No.: 16/155,309

(22) Filed: Oct. 9, 2018

(65) Prior Publication Data
US 2020/0108500 A1 Apr. 9, 2020

(51) Int. Cl.
*G06G 7/48* (2006.01)
*B25J 9/16* (2006.01)

(52) U.S. Cl.
CPC ... *B25J 9/1605* (2013.01); *G05B 2219/31368* (2013.01)

(58) Field of Classification Search
CPC ......... B25J 9/1605; G05B 2219/31368; G05B 19/4188; C12N 15/8216; C12N 15/8279; G06Q 10/063; Y02P 90/02
See application file for complete search history.

(56) References Cited

U.S. PATENT DOCUMENTS

| 2003/0225474 | A1* | 12/2003 | Mata ............... G05B 19/41865 700/121 |
| 2005/0067493 | A1 | 3/2005 | Urken |
| 2008/0027769 | A1 | 1/2008 | Eder |
| 2008/0140549 | A1 | 6/2008 | Eder |
| 2009/0083711 | A1* | 3/2009 | Singh ....................... G06F 8/71 717/121 |

(Continued)

OTHER PUBLICATIONS

Hoffman, Douglas. "Cost benefits analysis of test automation." STAR West 99 (1999).*

(Continued)

*Primary Examiner* — Rehana Perveen
*Assistant Examiner* — Nithya J. Moll
(74) *Attorney, Agent, or Firm* — Greenberg Traurig LLP

(57) ABSTRACT

Systems and methods for Bot automation lifecycle management are disclosed. According to one embodiment, in an information processing apparatus comprising at least one computer processor, a method for Bot automation lifecycle management may include: (1) receiving information on a proposed automation process; (2) using the information, calculating a complexity score, an automation time requirement, an automation cost, an automation efficiency, and a Bot requirement; (3) calculating a feasibility score based on the complexity score, the automation time requirement, the automation cost, the automation efficiency, and the Bot requirement; (4) generating a feasibility report based on the feasibility score; (5) exporting the proposed automation process to a build process; and (6) confirming the build process as complete and assessing an actual complexity score, an actual automation time requirement, an actual automation cost, an actual automation efficiency, and an actual Bot requirement.

20 Claims, 2 Drawing Sheets

(56) References Cited

U.S. PATENT DOCUMENTS

2010/0031358 A1     2/2010   Elovici et al.
2010/0229155 A1*   9/2010   Adiyapatham ..... G06F 11/3672
                                                                                                    717/124

OTHER PUBLICATIONS

Karasev, V. O., and V. A. Sukhanov. "Product lifecycle management using multi-agent systems models." Procedia Computer Science 103 (2017): 142-147.*

Kumar, Divya, and Krishn Kumar Mishra. "The impacts of test automation on software's cost, quality and time to market." Procedia Computer Science 79 (2016): 8-15.*

Rodrigues, Anderson, and Arilo Dias-Neto. "Relevance and impact of critical factors of success in software test automation lifecycle: A survey." Proceedings of the 1st Brazilian Symposium on Systematic and Automated Software Testing. 2016.*

International Search Report, dated Feb. 5, 2020, from corresponding International Application No. PCT/US2019/055556.

Written Opinion of the International Searching Authority, dated Feb. 5, 2020, from corresponding International Application No. PCT/US2019/055556.

* cited by examiner

SYSTEM AND METHOD FOR BOT AUTOMATION LIFECYCLE MANAGEMENT

BACKGROUND OF THE INVENTION

1. Field of the Invention

The present disclosure generally relates to systems and methods for Bot automation lifecycle management.

2. Description of the Related Art

Operations teams for an organization often perform a significant amount of mundane and manual activities which are prone to errors. Robotics-based automation tools are often used to address this situation. Not all activities are suitable for automation, and the return on investment is not known until after the automation is performed.

SUMMARY OF THE INVENTION

Systems and methods for Bot automation lifecycle management are disclosed.

According to one embodiment, in an information processing apparatus comprising at least one computer processor, a method for Bot automation lifecycle management may include: (1) receiving information on a proposed automation process; (2) using the information, calculating a complexity score, an automation time requirement, an automation cost, an automation efficiency, and a Bot requirement; (3) calculating a feasibility score based on the complexity score, the automation time requirement, the automation cost, the automation efficiency, and the Bot requirement; (4) generating a feasibility report based on the feasibility score; (5) exporting the proposed automation process to a build process; and (6) confirming the build process as complete and assessing an actual complexity score, an actual automation time requirement, an actual automation cost, an actual automation efficiency, and an actual Bot requirement.

In one embodiment, the method may further include using at least one of the actual complexity score, the actual automation time requirement, the actual automation cost, the actual automation efficiency, and the actual Bot requirement to calculate at least one of a second complexity score, a second automation time requirement, a second automation cost, a second automation efficiency, and a second Bot requirement for a second proposed automation process.

In one embodiment, the information on a proposed automation process may include at least one of a name of the proposed automation process, an end-to-end description of the proposed automation process, a number and type of applications in the proposed automation process, a number of steps in the proposed automation process; a number of independent steps in the proposed automation process, a trigger for the proposed automation process, a volume of activity associated with the proposed automation process, a regulatory requirement for the proposed automation process, and a complexity of a security framework for the proposed automation process.

In one embodiment, the information on the proposed automation process may be received in an interactive questionnaire.

In one embodiment, at least one of the complexity score, the automation time requirement, the automation cost, the automation efficiency may be provided a low score, medium score, or a high score. The weight variables applied to determine at least one of the complexity score, the automation time requirement, the automation cost, the automation may be adjustable. The weight variables may be based on at least one prior completed automation process.

In one embodiment, the feasibility report may present the feasibility score versus at least one of the complexity score, the automation time requirement, the automation cost, the automation efficiency, and the Bot requirement.

In one embodiment, the method may further include receiving a user acceptance testing assessment; and deploying the built automation process to a production environment.

In one embodiment, the method may further include receiving a risk assessment of the built automation process before deploying the built automation process to the production environment.

According to another embodiment, a system for Bot automation lifecycle management may include at least one computer processor executing a computer program; an automation module that generates a Bot for the automation process; and a Bot automation database that scores data for generating a feasibility score. In one embodiment, the computer program may receive information on a proposed automation process; may calculate a complexity score, an automation time requirement, an automation cost, an automation efficiency, and a Bot requirement; may calculate the feasibility score based on the complexity score, the automation time requirement, the automation cost, the automation efficiency, the Bot requirement, and the data from the Bot automation database; may generate a feasibility report based on the feasibility score; may export the proposed automation process to a build process executed by the automation module; and may confirm the build process as complete and assessing an actual complexity score, an actual automation time requirement, an actual automation cost, an actual automation efficiency, and an actual Bot requirement.

In one embodiment, using at least one of the actual complexity score, the actual automation time requirement, the actual automation cost, the actual automation efficiency, and the actual Bot requirement, the computer program may calculate at least one of a second complexity score, a second automation time requirement, a second automation cost, a second automation efficiency, and a second Bot requirement for a second proposed automation process.

In one embodiment, the information on a proposed automation process may include at least one of a name of the proposed automation process, an end-to-end description of the proposed automation process, a number and type of applications in the proposed automation process, a number of steps in the proposed automation process; a number of independent steps in the proposed automation process, a trigger for the proposed automation process, a volume of activity associated with the proposed automation process, a regulatory requirement for the proposed automation process, and a complexity of a security framework for the proposed automation process.

In one embodiment, the information on the proposed automation process may be received in an interactive questionnaire.

In one embodiment, at least one of the complexity score, the automation time requirement, the automation cost, the automation efficiency may be provided as a low score, medium score, or a high score.

In one embodiment, the weight variables applied to determine at least one of the complexity score, the automation time requirement, the automation cost, the automation may be adjustable.

In one embodiment, the weight variables may be based on at least one prior completed automation process.

In one embodiment, the feasibility report may present the feasibility score versus at least one of the complexity score, the automation time requirement, the automation cost, the automation efficiency, and the Bot requirement.

In one embodiment, the computer program may further receive a user acceptance testing assessment, and deploys the built automation process to a production environment.

In one embodiment, the computer program may receive a risk assessment of the built automation process before deploying the built automation process to the production environment.

BRIEF DESCRIPTION OF THE DRAWINGS

For a more complete understanding of the present invention, the objects and advantages thereof, reference is now made to the following descriptions taken in connection with the accompanying drawings in which.

DETAILED DESCRIPTION OF PREFERRED EMBODIMENTS

Figure 1:
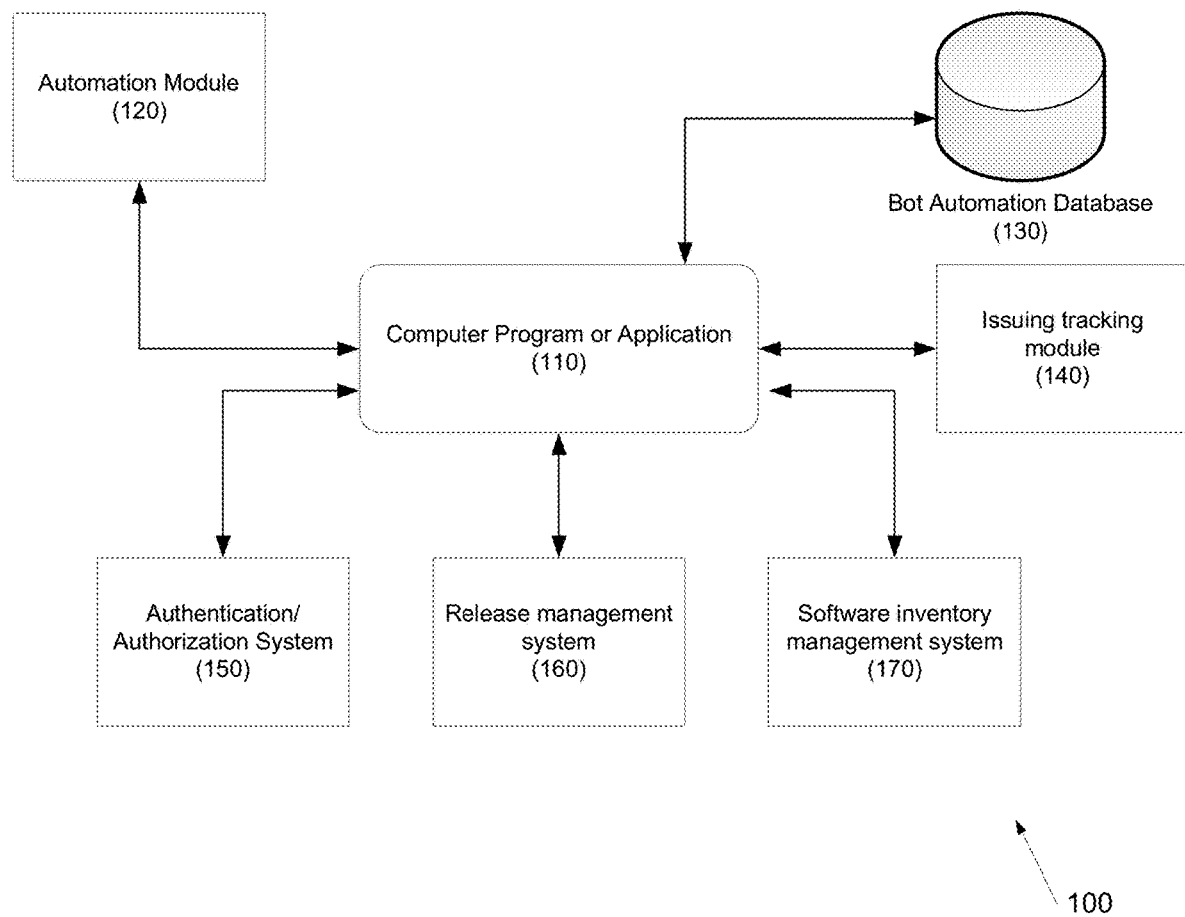
FIG. 1 depicts a system for Bot automation lifecycle management according to one embodiment.

Embodiments disclosed herein related to systems, methods, and devices for Bot automation lifecycle management.

Embodiments answer some of all of the following automation questions: Which processes should be chosen for automation? Is this a tactical or strategic solution? Which of those processes to automate first? Is there a way to prioritize and create an automation backlog? What process efficiencies (e.g., reduced cycle times, lower cost of process execution, eliminate manual errors, reduced risk events, dollar savings, reduced complexity, improved visibility, repeatable and consistent execution, etc.) would be gained post automation? How long would it take to automate a process? How much would it cost to automate a process?

Embodiments disclosed herein streamline automation initiatives by providing efficient workflows, engaging/providing visibility, and transparency. Embodiments may provide a way to construct a business case for automation considering the return on investment (ROI), a time and cost estimate, risk profiling, and potential process efficiencies. Embodiments may present a case for automation for approval (e.g., by a board or entity having approval authority) for sponsorship, and then initiating the build-out process. Embodiments may provide a front to back process automation lifecycle management (PALM) and may comply with an organization's requirements for security, risk, and control.

In embodiments, a Bot automation lifecycle management, or BALM, framework may be accessed via a web-based based portal, and may provide a process by which a process owner may provide information regarding a proposed Bot process. For example, the process owner may provide requirements, time, etc.

In embodiments, a "Bot calculator" may use a graded questionnaire and a mathematical model that computes a feasibility score for a process. Each set of questions targets one or more key attributes: (1) cost leverage post automation (e.g., labor-arbitrage approach); (2) time taken to automate; (3) process efficiencies achieved by automation; (4) complexity of implementation; and (5) volume (e.g., number of requests/tickets for the process). Once the questionnaire is answered by the process owner, the Bot calculator calculates a feasibility score. For example, the higher the feasibility score, the higher the value proposition of automation.

In one embodiment, machine learning algorithms, such as K-Means and linear regression models, may be used to calculate the feasibility score.

The feasibility score may be used to prioritize demand, and create an automation backlog along with estimating characteristics, such as cost savings, process efficiencies, time to automate, cost of automation, etc.

Embodiments further provide "end-to-end" automation audit capabilities. For example, it may provide details on when a candidate process was considered for automation, when it was designed, developed, tested and deployed, etc. The application captures not only when, but also who did made the changes and provided necessary approvals. This information may be critical to certain operations from the regulatory and audit point of view.

Referring to FIG. 1, a system for Bot automation lifecycle management is disclosed according to one embodiment. System 100 may include computer program or application 110 that may perform Bot automation lifecycle management. In one embodiment, computer program or application 110 may be executed by one or more computers, servers, etc.

System 100 may further include automation module 120, Bot automation database 130, issue tracking module 140, authentication/authorization system 150, release management system 160, and software inventory management system 170.

In one embodiment, computer program or application 110 may be executed by one or more computer processors (not shown) and may communicate with automation module 120, Bot automation database 130, issue tracking module 140, authentication/authorization system 150, release management system 160, and software inventor management system 170. In one embodiment, computer program or application 110 may perform calculations regarding Bot automation based on input from, for example, automation module 120, Bot automation database 130, and/or issue tracking module 140.

Automation module 120 may generate one or more Bot that may automate a process. In one embodiment, Automation Anywhere, available from Automation Anywhere, Inc. may be used. Other software and processes may be used as is necessary and/or desired.

In one embodiment, computer program or application 110 may use one or more cost and timing equations. The cost and timing equations used may depend, for example, on automation module 120 that is being used for automation. In one embodiment, the Cost per Unit of automation and Time per Unit of automation may be used in calculation of the feasibility score.

In one embodiment, computer program or application 110 may interact with automation module to audit the number of Bots running per process; audit the infrastructure (i.e., physical machines) on which Bots are running, audit that the Bots running are indeed running for the process which was permitted to be deployed, etc.

In one embodiment, computer program or application 110 may estimate the cost and simulate the timing of the Bot deployment process. In one embodiment, machine learning may be used to determine fixed cost and timing offsets based on prior Bot deployments.

Bot automation database 130 may store data that may be used to calculate the feasibility score of generating a Bot. In one embodiment, the data may include answers to the questions presented in the questionnaire; the computed "cost to build", "time required for automation", "process efficiency scores", "risk evaluation scores", "complexity evaluation scores", "total cost leverage", "feasibility score", etc.; the actual time taken for automation; answers to cost of automation, answers to questionnaires, design authority, etc.), infrastructure details (e.g., system information pertaining to IP address, domain name of machine on which the Bot is expected to run, etc.); identity and access management details (e.g., the "Functional ID" that the Bot is permitted to use, who is the process owner, who is the technology controls officer (TCO), who is the operations control management (OCM), who is the design authority, etc. for each process); audit information (e.g., who provided the necessary approval(s), when the approval(s) were provided, etc.); Bot activities/analytics (e.g., how long the Bots have been running, upstream and downstream applications the Bots are interacting with, process related attributes (e.g., number of transactions processed, time taken to process, etc.), number of failures/errors, etc.), etc.

Issue tracking module 140 may track issues with regard to the generation and/or operation of a Bot. In one embodiment, JIRA available from Atlassian, Inc. may be used to track issues. Other software and processes may be used as is necessary and/or desired.

The issues and processes that may be tracked or monitored include, for example, production management issues (e.g., issues pertaining to infrastructure, such as connectivity issues, access issues etc. on which Bots are running), functional or business issues (e.g., whether or not Bots were built per requirements), business stories/requirements (e.g., issues extracted out of the answers given to the questionnaire), etc.

Authentication/authorization system 150 may provide single-sign on for users to access computer program or application 110. Authentication/authorization system 150 may also govern an access mechanism for automation scripts used by automation module 120. This may include, for example, credentials to use scripts that may access other internal systems within the organization, credentials for using the scripts on specific machines etc.).

Release management system 160 may control the release of a Bot, which may be managed by computer program or application 110.

Software inventory management system 170 may provide software inventory management for computer program or application 110. In one embodiment, the software may include, for example, automation scripts that may be built as part of a Bot build process. These scripts may be built by automation module 120. Computer program or application 110 may manage the inventory of software in software inventory management system 170

Figure 2:
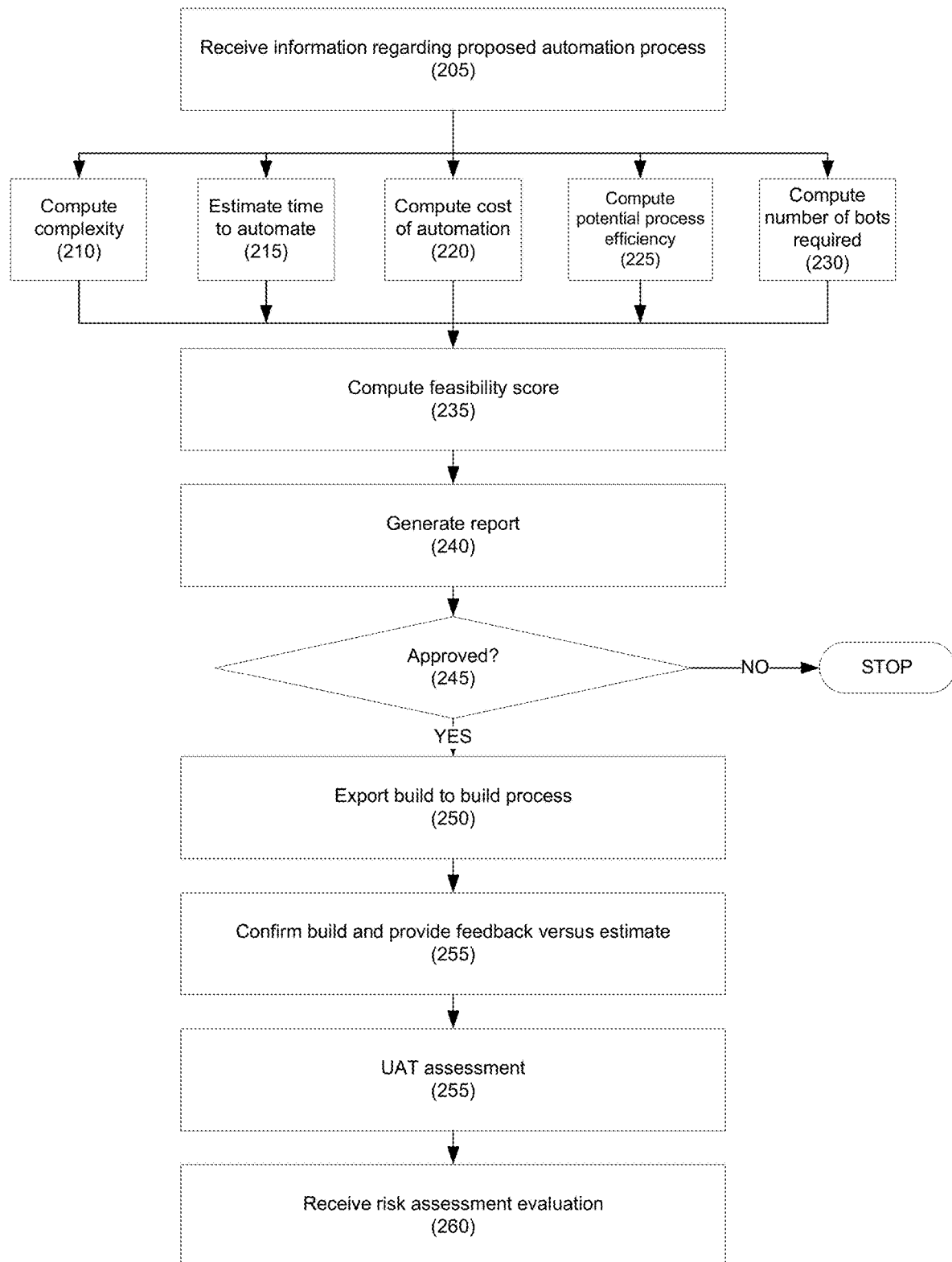
FIG. 2 depicts a method for Bot automation lifecycle management according to one embodiment.

Referring to FIG. 2, a method for Bot automation lifecycle management is disclosed according to one embodiment. In step 205, a computer program or application executed by a server may receive information regarding a proposed automation process. A process may be, for example, a business process that includes a series of steps that may be performed by individual users to achieve a shared goal. The steps are often repeated many times, by multiple users, in a standardized and optimized way. An example is a reconciliation process where users have to obtain and validate details from different sources.

"Steps" may refer to the actions performed to complete the process, such as logging into an application to obtain data.

The information may include, for example, a name of the proposed process, a description of the end-to-end proposed process, the number and type of applications that are involved in the proposed process, the number of steps that are performed to complete the process and the number of steps that are not dependent on each other and can occur concurrently, the process trigger(s) (e.g., system input, email, manual communication, etc.), information on process completion, escalation requirements, checker requirements, the need for any manual intervention, the ability to leverage existing applications, past risk event information, the headcount associated with the process, the volume of activity associated with the process, regulatory requirement information, the complexity of the security framework, the involvement of personal information in the process, whether money is disbursed at any step in the process, whether Bot resiliency is required, and a return-to-operation (RTO) time for the process.

In one embodiment, the RTO time may indicate how long it takes for a process to become operational after an incident. The RTO may vary depending on the process.

Based on the information received, in step 210, the application may calculate the complexity of automating the process. The complexity may indicate low complexity (e.g., easy to script, no requirements of external system integration, out of the box automation available in the chosen tool set), medium complexity (e.g., involves integration with one or two external systems that have fairly well defined interfaces), and high complexity (e.g., integration with external systems which do not have a well-documented interface— may involve screen scraping, data mapping and data enrichment requirements). Other classifications of complexity, levels of complexity, etc. may be used as is necessary and/or desired.

For example, Complexity (C) may be determined using the following equation:

$$C = Cl*Ccl + Cm*Ccm + Ch*Cch$$

where:
$Cl$=low complexity weight variable (e.g., 1);
$Ccl$=number of questions answered indicating low complexity;
$Cm$=medium complexity weight variable (e.g., 2);
$Ccm$=number of questions answered indicating medium complexity;
$Ch$=high complexity weight variable (e.g., 3);
$Cch$=number of questions answered indicating high complexity.

The complexity score may assessed the low, medium, or high score (or any other score) as is necessary and/or desired. For example, if there are five questions, and two are answered indicating a low complexity, two are answered indicating a medium complexity, and the last is answered indicating a high complexity, the complexity score is calculated as 9. On the scale of 5 (low) to 15 (high), this may be a medium complexity Bot.

In step 215, the application may estimate the time to automate the process. The low, medium, and timings may be based on any suitable scale. For example, low timing may indicate that it will take less than 5 days to automate; medium timing may indicate that it may take between 5 and 15 days to automate; and high timing may indicate that it may take more than 15 days to automate. Any suitable valuation may be used as is necessary and/or desired.

In one embodiment, the ranges may be calculated using, for example, Kmeans clustering such that low, medium, and high "buckets" may be calibrated as the process is executed. In order to cluster, historical facts of the calibrated process may be required.

In one embodiment, the timing score may be determined by the following equation:

$$\text{Timing score} = Tl*Tcl + Tin*Tcm + Th*Tch$$

where:
Tl=low timing weight variable (e.g., 1);
Tcl=number of questions answered indicating low timing;
Tm=medium timing weight variable (e.g., 2);
Tcm=number of questions answered indicating a medium timing;
Th=high timing weight variable (e.g., 3);
Tch=number of questions answered indicating a high timing.

In step 220, the application may calculate the cost of automation. The low, medium, and high costs may be based on any suitable scale. For example, low cost may indicate under $1000; medium cost may indicate between $1001 and $2999; and high cost may indicate more than $3000. Any suitable valuation may be used as is necessary and/or desired.

In one embodiment, the cost of automation (Tco) may be determined using the following equation:

$$Tco = FnCn - ClBn - Mco - Co$$

Tco is the actual cost leverage, or the dollar value that is saved for each automated process.

$$Co = Col*Cocl + Com*Cocm + Coh*Coch$$

where:
Co is the cost of automation computed above;
Col=low cost weight variable (e.g., 1);
Cocl=number of questions answered indicating low cost;
Cmo=medium cost weight variable (e.g., 2);
Cocm=number of questions answered indicating medium cost;
Coh=high cost weight variable (e.g., 3);
Coch=number of questions answered indicating high cost.

In step 225, the application may calculate the potential efficiencies gained by automating the process. In one embodiment, the potential efficiencies (Pei) may be determined using the following equation:

$$Pei - ImPm - IaPa$$

where:
Im=number of incidents pre-automation;
Pm=average cost per incident;
Ia=incidents post-automation (ideally, 0);
Pa=average cost of incident post-automation (ideally, 0).

In step 225, the application may calculate the number of Bots required to automate the process. In one embodiment, the number of Bots (Bn) may be determined using the following equation:

$$Bn = (V*Sn/C)*Ri$$

where:
V=volume (e.g., number of jobs/tickets expected per day);
Sn=number of steps in a process;
C=complexity factor (C=100[Low complexity factor], C=70[Medium complexity factor], C=50[High complexity factor]);
Ri=risk factor for the process.

For example, a high risk factor of a business process may indicate the need to run a greater number of Bots in parallel to address any fail-over needs.

In step 235, the application may calculate a feasibility score. In one embodiment, the feasibility score (fs) may be calculated using the following equation:

$$(fs) = nTcowPei \Bigg/ \left( \sum_{k=1}^{n} \binom{n}{k} w^k t^k + \sum_{k=1}^{n} \binom{n}{k} w^k c^k + \sum_{k=1}^{n} \binom{n}{k} w^k co^k \right)$$

In step 240, the application may generate an executive summary for the process, which may identify, for example, feasibility versus complexity, cost, and time, and in step 245, may be presented for approval.

If the build is approved, in step 250, the build for the process may be exported to a build process, and in step 255, after the Bot is built, the Bot is confirmed. Feedback for the actual factors—complexity, time to automate, cost, efficiency, and Bots required—may be provided to the algorithms used in steps 210, 215, 220, 225, and 230, above, as well as to the feasibility calculation to refine these algorithms.

In step 255, a User Acceptance Testing (UAT) assessment may be performed. In one embodiment, after the build process, the Bots may be deployed to a UAT environment, and the appropriate UAT teams are notified. Once the UAT is completed, the UAT users may provide feedback on the built Bots. After approval is received, the Bots may be deployed to production.

In step 260, a risk assessment evaluation may be received. For example, a standard set of risk and control checklist may be presented to assess the incremental risk introduced by automation of the process (e.g., developing the Bot). Based on evaluation, risk and control managers may grade the risk and provide sign off or approval, which may be captured in the BALM tool as evidence. Once sign off is provided, the Bot may be deployed to the production environment. The risk assessment also paves the way for changing the standard operating procedure of the process post-automation.

It should be noted that the information listed above is exemplary only, and some or all of this information, as well as different information, may be received as is necessary and/or desired.

In one embodiment, the information may be received via a web-based user interface. Other suitable interfaces may be used as is necessary and/or desired.

In one embodiment, the process may not include steps that require human judgement or analysis. For example, based on the current capacity of the team, the derived feasibility score of a process, and the past history of approvals, a mathematical model may provide automatic approval for the build.

Hereinafter, general aspects of implementation of the systems and methods of the invention will be described.

The system of the invention or portions of the system of the invention may be in the form of a "processing machine," such as a general purpose computer, for example. As used herein, the term "processing machine" is to be understood to include at least one processor that uses at least one memory. The at least one memory stores a set of instructions. The instructions may be either permanently or temporarily stored in the memory or memories of the processing machine. The processor executes the instructions that are stored in the memory or memories in order to process data. The set of instructions may include various instructions that perform a particular task or tasks, such as those tasks described above. Such a set of instructions for performing a particular task may be characterized as a program, software program, or simply software.

In one embodiment, the processing machine may be a specialized processor.

As noted above, the processing machine executes the instructions that are stored in the memory or memories to process data. This processing of data may be in response to commands by a cardholder or cardholders of the processing machine, in response to previous processing, in response to a request by another processing machine and/or any other input, for example.

As noted above, the processing machine used to implement the invention may be a general purpose computer. However, the processing machine described above may also utilize any of a wide variety of other technologies including a special purpose computer, a computer system including, for example, a microcomputer, mini-computer or mainframe, a programmed microprocessor, a micro-controller, a peripheral integrated circuit element, a CSIC (Customer Specific Integrated Circuit) or ASIC (Application Specific Integrated Circuit) or other integrated circuit, a logic circuit, a digital signal processor, a programmable logic device such as a FPGA, PLD, PLA or PAL, or any other device or arrangement of devices that is capable of implementing the steps of the processes of the invention.

The processing machine used to implement the invention may utilize a suitable operating system. Thus, embodiments of the invention may include a processing machine running the iOS operating system, the OS X operating system, the Android operating system, the Microsoft Windows™ operating systems, the Unix operating system, the Linux operating system, the Xenix operating system, the IBM AIX™ operating system, the Hewlett-Packard UX™ operating system, the Novell Netware™ operating system, the Sun Microsystems Solaris™ operating system, the OS/2™ operating system, the BeOS™ operating system, the Macintosh operating system, the Apache operating system, an OpenStep™ operating system or another operating system or platform.

It is appreciated that in order to practice the method of the invention as described above, it is not necessary that the processors and/or the memories of the processing machine be physically located in the same geographical place. That is, each of the processors and the memories used by the processing machine may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two pieces of equipment in two different physical locations. The two distinct pieces of equipment may be connected in any suitable manner. Additionally, the memory may include two or more portions of memory in two or more physical locations.

To explain further, processing, as described above, is performed by various components and various memories. However, it is appreciated that the processing performed by two distinct components as described above may, in accordance with a further embodiment of the invention, be performed by a single component. Further, the processing performed by one distinct component as described above may be performed by two distinct components. In a similar manner, the memory storage performed by two distinct memory portions as described above may, in accordance with a further embodiment of the invention, be performed by a single memory portion. Further, the memory storage performed by one distinct memory portion as described above may be performed by two memory portions.

Further, various technologies may be used to provide communication between the various processors and/or memories, as well as to allow the processors and/or the memories of the invention to communicate with any other entity; i.e., so as to obtain further instructions or to access and use remote memory stores, for example. Such technologies used to provide such communication might include a network, the Internet, Intranet, Extranet, LAN, an Ethernet, wireless communication via cell tower or satellite, or any client server system that provides communication, for example. Such communications technologies may use any suitable protocol such as TCP/IP, UDP, or OSI, for example.

As described above, a set of instructions may be used in the processing of the invention. The set of instructions may be in the form of a program or software. The software may be in the form of system software or application software, for example. The software might also be in the form of a collection of separate programs, a program module within a larger program, or a portion of a program module, for example. The software used might also include modular programming in the form of object oriented programming The software tells the processing machine what to do with the data being processed.

Further, it is appreciated that the instructions or set of instructions used in the implementation and operation of the invention may be in a suitable form such that the processing machine may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processing machine, i.e., to a particular type of computer, for example. The computer understands the machine language.

Any suitable programming language may be used in accordance with the various embodiments of the invention. Illustratively, the programming language used may include assembly language, Ada, APL, Basic, C, C++, COBOL, dBase, Forth, Fortran, Java, Modula-2, Pascal, Prolog, REXX, Visual Basic, and/or JavaScript, for example. Further, it is not necessary that a single type of instruction or single programming language be utilized in conjunction with the operation of the system and method of the invention. Rather, any number of different programming languages may be utilized as is necessary and/or desirable.

Also, the instructions and/or data used in the practice of the invention may utilize any compression or encryption technique or algorithm, as may be desired. An encryption module might be used to encrypt data. Further, files or other data may be decrypted using a suitable decryption module, for example.

As described above, the invention may illustratively be embodied in the form of a processing machine, including a computer or computer system, for example, that includes at least one memory. It is to be appreciated that the set of instructions, i.e., the software for example, that enables the computer operating system to perform the operations described above may be contained on any of a wide variety of media or medium, as desired. Further, the data that is processed by the set of instructions might also be contained on any of a wide variety of media or medium. That is, the particular medium, i.e., the memory in the processing machine, utilized to hold the set of instructions and/or the data used in the invention may take on any of a variety of physical forms or transmissions, for example. Illustratively, the medium may be in the form of paper, paper transparencies, a compact disk, a DVD, an integrated circuit, a hard disk, a floppy disk, an optical disk, a magnetic tape, a RAM, a ROM, a PROM, an EPROM, a wire, a cable, a fiber, a communications channel, a satellite transmission, a memory card, a SIM card, or other remote transmission, as well as any other medium or source of data that may be read by the processors of the invention.

Further, the memory or memories used in the processing machine that implements the invention may be in any of a wide variety of forms to allow the memory to hold instructions, data, or other information, as is desired. Thus, the memory might be in the form of a database to hold data. The database might use any desired arrangement of files such as a flat file arrangement or a relational database arrangement, for example.

In the system and method of the invention, a variety of "cardholder interfaces" may be utilized to allow a cardholder to interface with the processing machine or machines that are used to implement the invention. As used herein, a cardholder interface includes any hardware, software, or combination of hardware and software used by the processing machine that allows a cardholder to interact with the processing machine. A cardholder interface may be in the form of a dialogue screen for example. A cardholder interface may also include any of a mouse, touch screen, keyboard, keypad, voice reader, voice recognizer, dialogue screen, menu box, list, checkbox, toggle switch, a pushbutton or any other device that allows a cardholder to receive information regarding the operation of the processing machine as it processes a set of instructions and/or provides the processing machine with information. Accordingly, the cardholder interface is any device that provides communication between a cardholder and a processing machine. The information provided by the cardholder to the processing machine through the cardholder interface may be in the form of a command, a selection of data, or some other input, for example.

As discussed above, a cardholder interface is utilized by the processing machine that performs a set of instructions such that the processing machine processes data for a cardholder. The cardholder interface is typically used by the processing machine for interacting with a cardholder either to convey information or receive information from the cardholder. However, it should be appreciated that in accordance with some embodiments of the system and method of the invention, it is not necessary that a human cardholder actually interact with a cardholder interface used by the processing machine of the invention. Rather, it is also contemplated that the cardholder interface of the invention might interact, i.e., convey and receive information, with another processing machine, rather than a human cardholder. Accordingly, the other processing machine might be characterized as a cardholder. Further, it is contemplated that a cardholder interface utilized in the system and method of the invention may interact partially with another processing machine or processing machines, while also interacting partially with a human cardholder.

It will be readily understood by those persons skilled in the art that the present invention is susceptible to broad utility and application. Many embodiments and adaptations of the present invention other than those herein described, as well as many variations, modifications and equivalent arrangements, will be apparent from or reasonably suggested by the present invention and foregoing description thereof, without departing from the substance or scope of the invention.

Accordingly, while the present invention has been described here in detail in relation to its exemplary embodiments, it is to be understood that this disclosure is only illustrative and exemplary of the present invention and is made to provide an enabling disclosure of the invention. Accordingly, the foregoing disclosure is not intended to be construed or to limit the present invention or otherwise to exclude any other such embodiments, adaptations, variations, modifications or equivalent arrangements.

What is claimed is:

1. A method for Bot automation lifecycle management, comprising:
    in an information processing apparatus comprising at least one computer processor:
    receiving information on a proposed automation process, wherein the proposed automation process includes a proposal to automate a user process, wherein the information includes a series of steps performed by a user within a computer program, and wherein the series of steps includes steps performed by the user to complete the user process;
    using the information, calculating a complexity score, wherein a value of the complexity score is calculated based on a number of answers to a corresponding number of questions,
    using the information, calculating an automation time requirement, an automation cost, an automation efficiency, and a number of Bots required to automate the user process;
    calculating a feasibility score based on the complexity score, the automation time requirement, the automation cost, the automation efficiency, and the number of Bots required to automate the user process;
    generating a feasibility report based on the feasibility score;
    exporting the proposed automation process to a build process;
    building, through the build process, the proposed automation process, including the number of Bots required to automate the user process, wherein the building produces a built automation process; and
    confirming the build process as complete and assessing an actual complexity score, an actual automation time requirement, an actual automation cost, an actual automation efficiency, and an actual number of Bots required to automate the user process.

2. The method of claim 1, further comprising:
    using at least one of the actual complexity score, the actual automation time requirement, the actual automation cost, the actual automation efficiency, and the actual number of Bots required to automate the user process to calculate at least one of a second complexity score, a second automation time requirement, a second automation cost, a second automation efficiency, and a second number of Bots required to automate a second user process for a second proposed automation process.

3. The method of claim 1, wherein the information on a proposed automation process comprises at least one of a name of the proposed automation process, an end-to-end description of the proposed automation process, a number and type of applications in the proposed automation process, a number of independent steps in the proposed automation process, a trigger for the proposed automation process, a volume of activity associated with the proposed automation process, a regulatory requirement for the proposed automation process, and a complexity of a security framework for the proposed automation process.

4. The method of claim 1, wherein the information on the proposed automation process is received from an interactive questionnaire.

5. The method of claim 1, wherein at least one of the complexity score, the automation time requirement, the automation cost, the automation efficiency is provided as a low score, medium score, or a high score.

6. The method of claim 5, wherein weight variables applied to determine at least one of the complexity score, the automation time requirement, the automation cost, or the automation efficiency are adjustable.

7. The method of claim 6, wherein the weight variables are based on at least one prior completed automation process.

8. The method of claim 1, wherein the feasibility report presents the feasibility score versus at least one of the complexity score, the automation time requirement, the automation cost, the automation efficiency, and the number of Bots required to automate a second user process.

9. The method of claim 1, further comprising:
receiving a user acceptance testing assessment; and
deploying the built automation process to a production environment.

10. The method of claim 9, further comprising:
receiving a risk assessment of the built automation process before deploying the built automation process to the production environment.

11. A system for Bot automation lifecycle management, comprising:
at least one computer processor executing a computer program; an automation module; and a Bot automation database that scores data for generating a feasibility score;
wherein:
the computer program receives information on a proposed automation process, wherein the proposed automation process includes a proposal to automate a user process, wherein the information includes a series of steps performed by a user within a computer program, and wherein the series of steps includes steps performed by the user to complete the user process;
the computer program calculates a complexity score, wherein a value of the complexity score is calculated based on a number of answers to a corresponding number of questions,
the computer program calculates an automation time requirement, an automation cost, an automation efficiency, and a number of Bots required to automate the user process;
the computer program calculates the feasibility score based on the complexity score, the automation time requirement, the automation cost, the automation efficiency, the number of Bots required to automate the user process, and the data from the Bot automation database;
the computer program generates a feasibility report based on the feasibility score;

the computer program exports the proposed automation process to a build process executed by the automation module;
the automation module builds the proposed automation process, including the number of Bots required to automate the user process, wherein the building produces a built automation process; and
the computer program confirms the build process as complete and assessing an actual complexity score, an actual automation time requirement, an actual automation cost, an actual automation efficiency, and an actual number of Bots required to automate the user process.

12. The system of claim 11, wherein using at least one of the actual complexity score, the actual automation time requirement, the actual automation cost, the actual automation efficiency, and the actual number of Bots required to automate the user process, the computer program calculates at least one of a second complexity score, a second automation time requirement, a second automation cost, a second automation efficiency, and a second number of Bots required to automate a second user process for a second proposed automation process.

13. The system of claim 11, wherein the information on a proposed automation process comprises at least one of a name of the proposed automation process, an end-to-end description of the proposed automation process, a number and type of applications in the proposed automation process, a number of independent steps in the proposed automation process, a trigger for the proposed automation process, a volume of activity associated with the proposed automation process, a regulatory requirement for the proposed automation process, and a complexity of a security framework for the proposed automation process.

14. The system of claim 11, wherein the information on the proposed automation process is received from an interactive questionnaire.

15. The system of claim 11, wherein at least one of the complexity score, the automation time requirement, the automation cost, the automation efficiency is provided as a low score, medium score, or a high score.

16. The system of claim 15, wherein weight variables applied to determine at least one of the complexity score, the automation time requirement, the automation cost, or the automation efficiency are adjustable.

17. The system of claim 16, wherein the weight variables are based on at least one prior completed automation process.

18. The system of claim 11, wherein the feasibility report presents the feasibility score versus at least one of the complexity score, the automation time requirement, the automation cost, the automation efficiency, and the number of Bots required to automate a second user process.

19. The system of claim 11, wherein the computer program further receives a user acceptance testing assessment, and deploys the built automation process to a production environment.

20. The system of claim 19, wherein the computer program receives a risk assessment of the built automation process before deploying the built automation process to the production environment.

* * * * *